(12) United States Patent
Brill et al.

(10) Patent No.: US 7,896,400 B2
(45) Date of Patent: Mar. 1, 2011

(54) SYSTEM FOR PRE-POSITIONING A HOSE CLAMP ON A HOSE END

(75) Inventors: Hartmut Brill, Bad Soden-Allendorf (DE); Matthias Dönch, Staufenberg (DE); Günther Speelmann, Hannoversch-Münden (DE); Gerhard Will, Hannoversch-Münden (DE)

(73) Assignee: ContiTech MGW GmbH, Hannoversch-Muenden (DE)

( * ) Notice: Subject to any disclaimer, the term of this patent is extended or adjusted under 35 U.S.C. 154(b) by 0 days.

(21) Appl. No.: 12/379,570

(22) Filed: Feb. 25, 2009

(65) Prior Publication Data

US 2009/0189389 A1 Jul. 30, 2009

Related U.S. Application Data

(63) Continuation of application No. PCT/EP2007/057361, filed on Jul. 17, 2007.

(30) Foreign Application Priority Data

Aug. 25, 2006 (DE) .................. 10 2006 039 847
Dec. 6, 2006 (DE) .................. 10 2006 057 497

(51) Int. Cl.
*B65D 57/00* (2006.01)
(52) U.S. Cl. .................. 285/23; 285/242; 285/255
(58) Field of Classification Search .......... 285/242, 285/244, 255, 379, 23; 29/450; 248/226.11
See application file for complete search history.

(56) References Cited

U.S. PATENT DOCUMENTS 1,454,783 A * 5/1923 Yetter ..................... 24/710.5
3,407,448 A * 10/1968 Tetzlaff et al. ............... 24/19
3,407,449 A * 10/1968 Tetzlaff et al. ............... 24/19
4,312,525 A * 1/1982 Kleykamp .................. 285/236

(Continued)

FOREIGN PATENT DOCUMENTS

DE 103 24 236 8/2004

(Continued)

*Primary Examiner*—Essama Omgba
(74) *Attorney, Agent, or Firm*—Walter Ottesen

(57) ABSTRACT

A system for pre-positioning a hose clamp (2) on a hose end (24) includes: a) a fixing part (1') which is connected non-releasably to an annular segment of the hose clamp (2) and is fastened to the hose end (24), and b) one or more fixing parts (1, 1") which each have a U-shaped element which, fastened to the hose end (24), is directed with its open side (3) to the hose surface. The web (6) connects the two U-legs (4, 5) and extends axially and parallel to the hose surface. The U-leg (4), which lies closest to the hose end (24), has a connecting element (7) for attaching the U-shaped element to the end face of the hose end (24). The U-shaped element is configured in such a way that the hose clamp (2), which is pulled on to the hose end (24), is fixed releasably in the intermediate space (8) of the U-shaped element by way of an annular segment of the hose clamp in such a way that the hose clamp (2) is released from the fixing when tightened. The fixing part (1) remains without function on the hose end (24) after the hose clamp (2) has been tightened.

27 Claims, 5 Drawing Sheets

U.S. PATENT DOCUMENTS

| | | | |
|---|---|---|---|
| 4,453,289 A * | 6/1984 | Kleykamp et al. | 24/20 TT |
| 5,015,015 A * | 5/1991 | Fetters | 285/114 |
| 5,749,603 A * | 5/1998 | Mann | 285/23 |
| 6,695,354 B2 | 2/2004 | Brockmann et al. | |
| 6,942,253 B2 * | 9/2005 | Bowater | 285/23 |
| 7,380,834 B2 * | 6/2008 | Smith et al. | 285/23 |
| 7,458,619 B2 * | 12/2008 | Cassel et al. | 285/420 |
| 7,648,174 B2 * | 1/2010 | Tanaka et al. | 285/23 |
| 2005/0087979 A1 | 4/2005 | Col | |
| 2007/0018063 A1 | 1/2007 | Lange et al. | |

FOREIGN PATENT DOCUMENTS

| | | |
|---|---|---|
| EP | 0 593 852 | 4/1994 |
| EP | 1 445 526 | 8/2004 |
| FR | 2 630 808 | 11/1989 |

\* cited by examiner

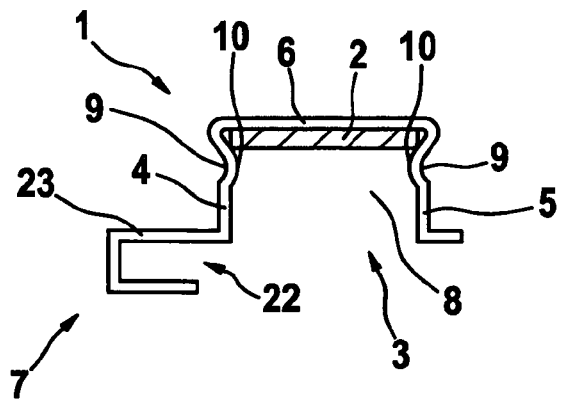
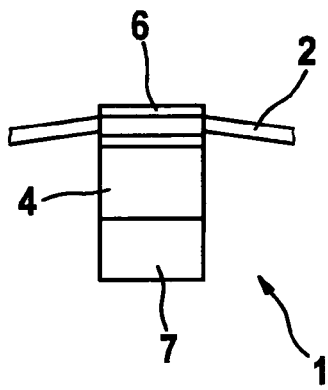
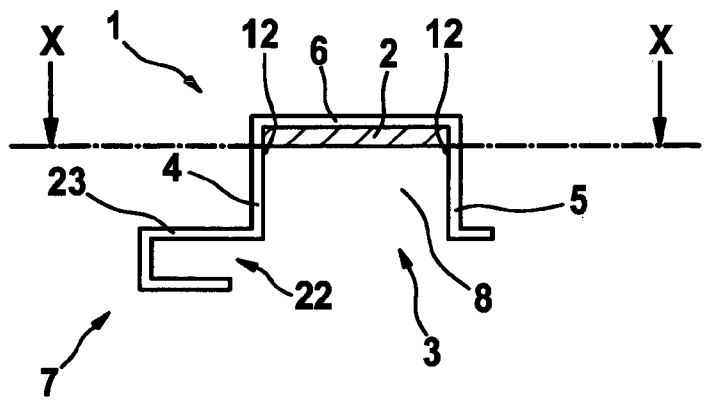
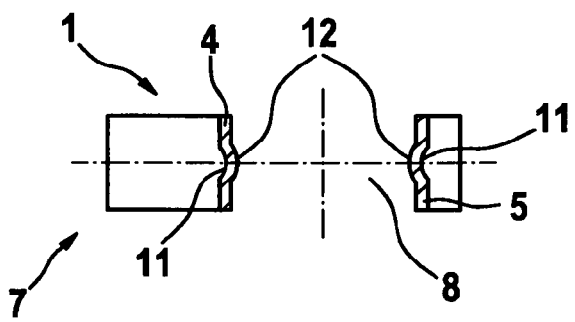
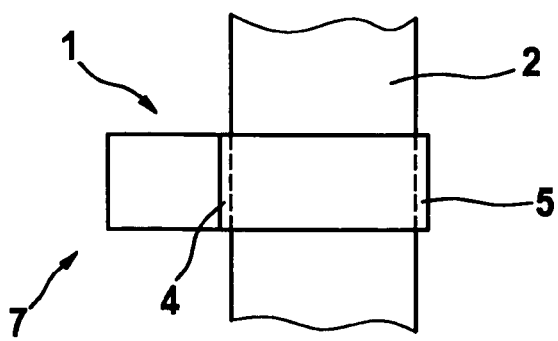

SYSTEM FOR PRE-POSITIONING A HOSE CLAMP ON A HOSE END

CROSS REFERENCE TO RELATED APPLICATIONS

This application is a continuation application of international patent application PCT/EP 2007/057361, filed Jul. 17, 2007, designating the United States and claiming priority from German applications 10 2006 039 847.5 and 10 2006 057 497.4, filed Aug. 25, 2006 and Dec. 6, 2006, respectively, and the entire contents of said applications are incorporated herein by reference.

FIELD OF THE INVENTION

The invention relates to a system for pre-positioning a hose clamp on a hose end, in particular of a charge-air hose and cooling-water hose.

BACKGROUND OF THE INVENTION

Charge-air hoses have to be securely connected to fixed components, such as plastic or metal pipes, the turbocharger, the charge-air cooler or the engine inlet system. The hitherto used connections between the elastomer hoses and the rigid components are predominantly based on the clamping principle. This applies both to conventional connections, for example, the fastening of a hose with a hose clamp, and for more recent plug-in connections in which an end piece is likewise pressed onto the hose.

In this type of connection, the hose end is pushed onto a fixed connecting piece and is subsequently clamped with a hose clamp. The hose and hose clamp are customarily manufactured such that they are preassembled at a distributor and are supplied for the final assembly. To this end, the hose clamp is to be fastened to the hose so as not to become separated therefrom. The hose clamp is to be fastened such that it is axially and radially secure in preassembly. However, the hose clamp must not be restricted or blocked.

European patent publication 0 593 852 B1 discloses a hose clamp with a retaining part which is of annular design and is comprised of elastic material, wherein the retaining part comprises two coaxial and open rings which are arranged next to each other. The ends of the rings are connected in pairs to each other in the axial direction by webs. In this case, the hose clamp is inserted between the open rings.

U.S. Pat. No. 6,695,354 discloses a hose arrangement which comprises a hose made of polymeric material and is in particular provided with an embedded reinforcement. At least one hose end is pushed onto a metal or plastic pipe stub and a screw clamp presses the hose end onto the pipe stub.

The known solutions for fastening the hose clamps have substantial disadvantages residing in possible assembly errors. Furthermore, it is not precluded that the particular fastening means damage the hose pipe stub during the assembly of the hose clamp.

SUMMARY OF THE INVENTION

It is an object of the invention to realize a pre-fastening of a hose clamp to a hose end in an easy-to-assemble manner, in particular to provide a structurally simple system for pre-positioning a hose clamp, with the system securing the hose clamp on a hose end in a manner so as to prevent twisting and axial displacement.

The system according to the invention for pre-positioning a hose clamp on a hose end includes a) a fixing part which is connected non-releasably to an annular segment of the hose clamp and is fastened to the hose end, and b) one or more, preferably two, fixing parts which each have a U-shaped element which, fastened to the hose end, is directed with its open side to the hose surface. The web, which connects the two U-legs, runs axially and parallelly to the hose surface and the U-leg closest to the hose end has a connecting element with which the U-shaped element is fastened to the end face of the hose end.

According to the invention, the U-shaped element is designed in such a manner that the hose clamp, which is pulled onto the hose end, is fixed releasably in the intermediate space of the U-shaped element by means of an annular segment such that the hose clamp is released from the fixation during tightening. The fixing part remains without function on the hose end after the hose clamp has been tightened. Or, the U-shaped element is designed in such a manner that the hose clamp, which is pulled onto the hose end, is placed loosely but securely in the intermediate space of the U-shaped element with an annular segment. The hose clamp is secured by the two U-legs against axial displacement, with the fixing part remaining without function on the hose end after the hose clamp has been tightened.

The effect achieved by a simple system of this type is that the hose clamp is positioned on the hose end in a defined, easy-to-install and captive manner. The fixing parts, which are preferably spaced uniformly from one another, prevent twisting of the hose clamp in the axial and radial directions.

The fixing part, which is connected non-releasably to the annular segment of the hose clamp and is fastened to the hose end, forms a clamp fixation point and prevents radial twisting or rotation of the hose clamp.

Axial displacement of the hose clamp is prevented by the further fixing part or by the further, preferably two further, fixing parts. The hose clamp is preferably fixed releasably or placed loosely in these fixing parts at a clear distance from the hose surface. When the hose clamp is tightened, the hose clamp band diameter is reduced, with the hose clamp being pulled out of the above-mentioned fixing parts.

According to an advantageous embodiment of the invention, the fixing part, which is connected non-releasably to the annular segment of the hose clamp preferably by means of spot welding, is connected to the annular segment in such a manner that, after the fixing part has been installed on the hose end, the hose clamp rests on the hose surface in the region of the annular segment.

Like the further fixing part or the further fixing parts, the fixing part connected non-releasably to the annular segment of the hose clamp preferably has a U-shaped element which, fastened to the hose end, points with its open side to the hose surface, with the web, which connects the two U-legs, running axially and parallelly to the hose surface, and with the U-leg closest to the hose end having a connecting element with which the U-shaped element is fastened to the end face of the hose end.

A further embodiment of the invention provides that the fixing parts and the hose clamp can be connected to form a unit before being installed on the hose end in order to be fastened to the hose end in a simpler and better manner. The fixing parts can subsequently be fastened by their connecting elements to the end face of the hose end such that the hose clamp is then pre-positioned in the open state on the hose end in a manner so as to be secure against twisting and against radial and axial displacement.

After the hose end has been pushed onto a pipe stub, the hose clamp can then be securely tightened, with the hose clamp being released from the fixing part or the further fixing parts and pressing the hose end onto the pipe stub. There need be no concern that the fixing parts will have a negative influence. They remain without function on the hose end.

Since the fixing part according to the invention is reduced in number of parts and can be produced with small dimensions, the space required is extremely small. The system is simple to install on the hose end.

As an alternative to the releasable fixing, a fixing part, which is intended to secure the pre-positioned hose clamp on the hose end only against axial displacement, is formed in a surprisingly simple manner in that the hose clamp, which is pulled onto the hose end, is placed loosely in the intermediate space of the U-shaped element with an annular segment, with the fixing part likewise remaining without function on the hose end after the hose clamp has been tightened. In this way, the two U-legs secure the hose clamp against axial displacement before and during tightening.

A further embodiment of the invention provides that the releasable fixing is defined by a releasable snap-in or latching connection between the annular segment and the U-legs. This involves a particularly simply designed connection which readily fulfils its purpose of releasably fixing the hose clamp.

Furthermore, it is provided that the insides of the U-legs each have, for the releasable fixing of the annular segment, one or more hooks, nubs, bulges or other projections which, toward the web, form undercuts into which the side edges of the annular segment can be releasably latched. As a result, the hose clamp can be connected particularly simply to the fixing part or the fixing parts.

An advantageous embodiment of the invention provides that the outsides of the U-legs have a crease running parallel to the hose surface such that a corresponding projection is produced in each case on the insides of the U-legs in order to form an undercut into which the side edges of the annular segment can be releasably latched.

An alternative advantageous embodiment of the invention provides that the outsides of the U-legs have at least one punch indent such that a corresponding projection is produced in each case on the insides of said U-legs in order to form an undercut into which the side edges of the annular segment can be releasably latched.

Another embodiment of the invention provides that the insides of the U-legs each have, for the releasable fixing of the annular segment, one or more undercuts, in particular in the form of grooves, notches or other depressions into which the side edges of the annular segment can be releasably latched. The U-legs essentially form the snap-in arms.

According to the invention, the releasable fixing can also be produced by means of a releasable snap-in or latching connection between the annular segment and the web.

For this purpose, the web is preferably designed as a U-shaped plastic part which is directed with its open side to the hose surface, with the web of the plastic part, which web connects the two U-legs, running axially and parallelly to the hose surface. The ends of the U-legs of the web have respective inwardly pointing projections and these projections form undercuts toward the web of the plastic part into which the side edges of the annular segment can be releasably latched.

A further embodiment of the invention provides that parts of the U-shaped element or of the annular segment are plastically deformable for releasably fixing the hose clamp.

For this purpose, the U-legs preferably each have a tab, one tab lying opposite the other and being pressed at its free end out of the leg wall into the intermediate space and being aligned with the hose surface such that the annular segment of the hose clamp is arranged fixed between the web and tab, with the tabs being pressed back into the leg wall during tightening of the hose clamp.

This involves a releasable fixing by means of deformation rather than a latching or snap-in connection. The hose clamp or the annular segment thereof is first brought into the intermediate space of the U-shaped element. The hose clamp is then fixed between web and tab by the tabs being pressed in. When the hose clamp is tightened, the force acting on the tabs undoes the pressing-in thereof again.

Furthermore, it is provided that both the web of the U-shaped element and the annular segment of the hose clamp have a through bore and can be connected to each other by means of a plastic rivet in such a manner that the plastic rivet is pulled out of the through bore during tightening of the hose clamp, with the hose clamp being released.

Furthermore, it is provided that the web of the U-shaped element has a through bore, and the annular segment of the hose clamp has a protuberance, with the protuberance being guided through the through bore and being bent outward in order to releasably fix the hose clamp to the U-shaped element. This connection is preferably an annular snap-in connection.

As an alternative thereto, the annular segment of the hose clamp can be clamped or wedged releasably between the U-legs in a frictional manner, with the insides of the U-legs converging in a wedge-shaped manner toward the web.

The connecting element is preferably pressed onto the hose end or pushed and pressed into the hose end or inserted and pressed into shaped openings. Since there is the risk during pressing that the hose stub will be damaged, the insertion variant is preferable.

The connecting element is preferably a U-shaped part, the open end of which is directed to the end face of the hose end, with one U-leg of the connecting element being connected to the U-leg of the U-shaped element to form an integral element therewith.

The fixing part is preferably comprised of metal and/or of plastic.

BRIEF DESCRIPTION OF THE DRAWINGS

The invention will now be described with reference to the drawings described below.

FIGS. 1a and 1b show, schematically, a fixing part provided with creases and with a latched-in hose clamp in side view (FIG. 1a) and plan view (FIG. 1b) viewed in the direction of the end face of the hose end.

FIGS. 2a to 2c show, schematically, a fixing part provided with a punch indent and with a latched-in hose clamp. FIG. 2a shows a side view and FIG. 2c shows a plan view viewed in the direction of the surface of the hose end and without a latched-in hose clamp. FIG. 2b is a plan view of the section x-x shown in FIG. 2a.

FIG. 3a is a side view and FIG. 3c is a plan view looking in the direction of the surface of the hose end and without a latched-in hose clamp. FIG. 3b is a plan view of the section x-x shown in FIG. 3a.

FIG. 4a is a side view and FIG. 4b is a plan view looking in the direction of the end face of the hose end and FIG. 4c is a plan view looking in the direction of the surface of the hose end.

FIG. 5a is a side view and FIG. 5b is a plan view looking in the direction of the end face of the hose end.

FIG. 6a shows a side view and FIG. 6b is a view looking in the direction of the end face of the hose end.

FIG. 7a is a side view and FIG. 7b is a view looking in the direction of the end face of the hose end.

In all the figures, identical reference numbers refer to identical components.

DESCRIPTION OF THE PREFERRED EMBODIMENTS OF THE INVENTION

Figure 3A:
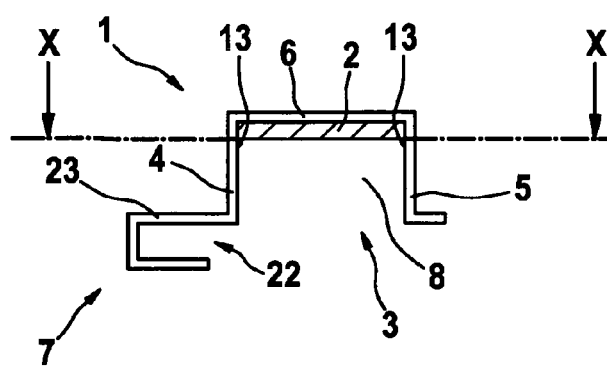
FIGS. 3a to 3c show, schematically, a fixing part provided with notches and with a latched-in hose clamp.

FIGS. 1a and 1b show, schematically, a fixing part 1 having a crease 9 and with a latched-in hose clamp 2. FIG. 1a is a side view and FIG. 1b is a plan view viewed in the direction of the end face of the hose end (not shown here).

The fixing part 1 serves to pre-position a hose clamp on a hose end before the latter is pushed onto a pipe stub. Here, it is necessary for the hose clamp to be initially arranged in spaced relationship to the hose, that is, to be able to be tightened so that the hose end can be pushed onto the pipe stub. Only thereafter is the hose end fastened to the pipe stub by the hose clamp being tightened.

According to the invention, the fixing part 1 comprises a U-shaped element which, fastened to the hose end, faces with its open side 3 to the hose surface and the web 6, which connects the two U legs (4,5), runs axially and parallelly to the hose surface.

The U-leg 4 closest to the hose end has a connecting element 7 with which the U-shaped element is fastened to the end face of the hose end. According to the invention, the connecting element 7 is a U-shaped part, the open end 22 of which faces to the end face of the hose end and a U-leg 23 of the connecting element 7 is connected to the U-leg 4 of the U-shaped element, preferably as an integral part.

The connecting element 7 is either pressed onto the hose end, with the end-face hose wall being located between the U-legs of the connecting element 7, or the connecting element 7 is pushed into the hose end, with the U-leg of the connecting element 7, which U-leg is not connected to the U-leg 4 of the U-shaped element, then being disposed in the end-face hose wall.

The U-shaped element is configured so that the hose clamp 2, which is pulled onto the hose end, is fixed releasably in the intermediate space 8 of the U-shaped element by an annular segment so that the hose clamp 2 is released from the fixing when tightened, with the fixing part 1 remaining without function on the hose end after the hose clamp 2 has been tightened.

The releasable fixing shown in FIG. 1 is a releasable snap-in or latching connection between the annular segment of the hose clamp 2 and the U-legs (4, 5).

According to the invention, the outsides of the U-legs (4, 5) have respective creases 9 running parallel to the hose surface (not shown here) such that corresponding projections 10 are formed on respective sides of the U-legs to form an undercut into which the side edges of the annular segment are releasably latched. In this case, the creases 9 are designed in such a manner that the hose clamp is released from the fixing, that is from the undercut, during tightening.

FIGS. 2a to 2c show, schematically, a fixing part 1 provided with a punch indent 11 and with a latched-in hose clamp 2. FIG. 2a shows a side view and FIG. 2c shows a plan view viewed in the direction of the surface (not illustrated here) of the hose end and without a latched-in hose clamp 2. FIG. 2b shows a plan view at section x-x of FIG. 2a.

With regard to the general configuration of the fixing part 1, reference is made to the description for FIG. 1 in order to avoid repetition, with identical reference numbers referring to identical parts.

The fixing part 1 illustrated in FIGS. 2a to 2c differs from the fixing part 1 shown in FIGS. 1a and 1b in that the outsides of the U-legs do not have a crease, but rather have at least one punch indent 11 in such a manner that a corresponding projection 12 is produced on respective inner sides of the U-legs to form an undercut into which the side edges of the annular segment are releasably latched or, with respect to FIG. 2b, can be releasably latched.

Figure 3B:
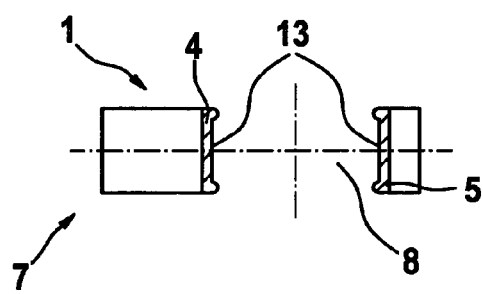
Figure 3C:
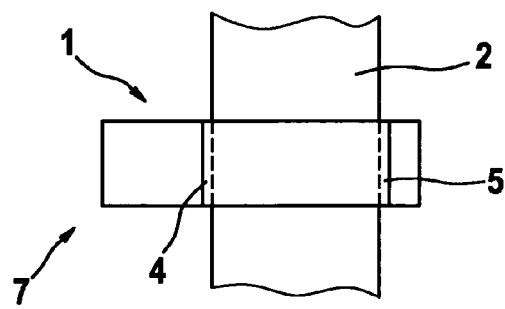

FIGS. 3a to 3c show a fixing part 1 provided with notches 13 and with a latched-in hose clamp 2. FIG. 3a is a side view and FIG. 3c is a plan view looking toward the surface (not shown here) of the hose end. FIG. 3b is a plan view of the section x-x shown in FIG. 3a without the hose clamp 2.

With regard to the general configuration of the fixing part 1, reference is made to the description for FIGS. 1a and 1b for the purpose of avoiding repetition with identical reference numbers referring to identical components.

For releasably fixing the annular segment of the hose clamp 2, the inner sides of the U-legs (4, 5) of the fixing part 1 have respective undercuts in the form of notches 13 into which the side edges of the annular segment are latched releasably or, with respect to FIG. 3b, can be latched releasably.

Instead of a releasable snap-in or latching connection between the annular segment and the U-legs (4, 5), a releasable snap-in or latching connection can also be provided between the annular segment and the web 6.

Figure 4A:
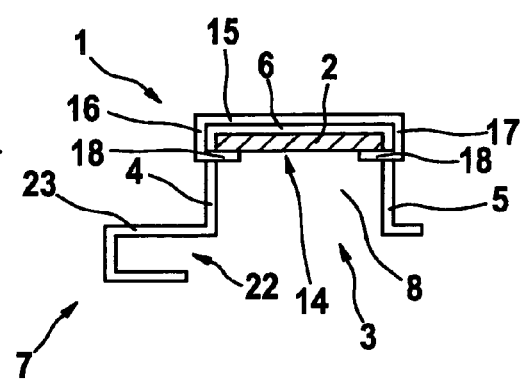
FIGS. 4a to 4c show, schematically, a fixing part provided with a molded plastic part and with a latched-in hose clamp.
Figure 4B:
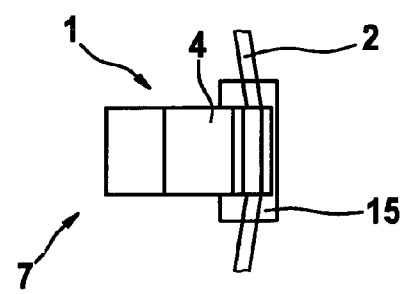
Figure 4C:
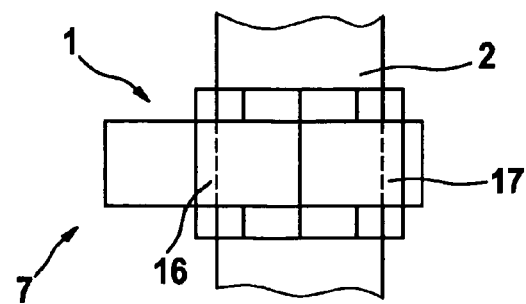

A fixing part 1 of the above type is shown in FIGS. 4a to 4c. FIGS. 4a to 4c show, schematically, a fixing part 1 provided with a molded plastic part and with a latched-in hose clamp 2. In FIG. 4a, a side view is shown and FIG. 4b shows a plan view looking toward the end face (not shown here) of the hose end. FIG. 4c is a plan view looking in the direction of the surface (not shown here) of the hose end.

With regard to the general configuration of the fixing part 1, reference is made to the description for FIGS. 1a and 1b for the purpose of avoiding repetition with identical reference numbers referring to identical components.

According to the invention, in the embodiment of the fixing part 1 shown in FIGS. 4a to 4c, the web 6 is a plastic part which is U-shaped in cross section and faces, with its open side 14, to the hose surface. The web 15 of the plastic part connects the two U-legs and runs axially and parallelly to the hose surface. The ends of the U-legs (16, 17) of the web 15 have respective inwardly pointing projections 18 and these projections define undercuts toward the web 15 of the plastic part. Side edges of the annular segment are releasably latched in these undercuts.

Figure 5A:
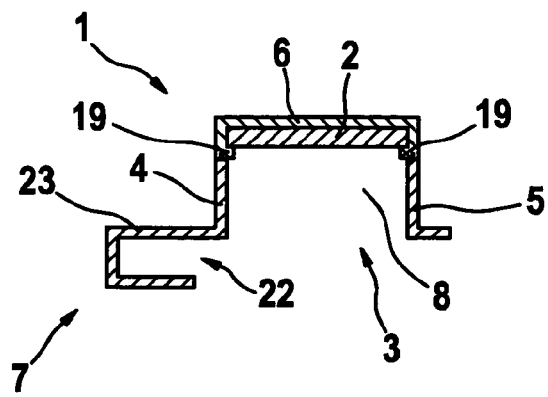
FIGS. 5a and 5b show, schematically, a fixing part provided with plastically deformable tabs and with a fixed hose clamp.
Figure 5B:
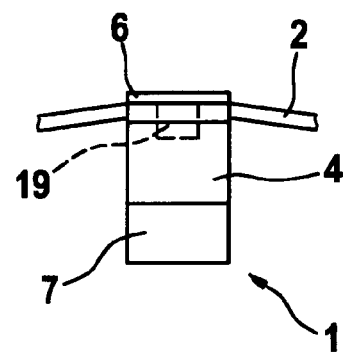

Furthermore, it is possible for parts of the U-shaped element or of the annular segment to be plastically deformable for releasably fixing the hose clamp 2. One such fixing part 1 is illustrated in FIGS. 5a and 5b. FIGS. 5a and 5b show, schematically, a fixing part provided with plastically deformable tabs and with a fixed hose clamp in a side view in FIG. 5a and a plan view in FIG. 5b looking toward the end face (not shown here) of the hose end.

For the releasable fixing of the hose clamp 2, the U-legs (4, 5) each have a tab 19. The tabs 19 lie opposite each other and are pressed at their respective free ends out of the corresponding leg wall into the intermediate space 8 and are aligned with the hose surface (not shown here) in such a manner that the annular segment of the hose clamp 2 is fixed between the web 6 and tabs 19. According to the invention, when the hose clamp is tightened, the tabs 19 are pressed back into the respective leg walls with the hose clamp 2 being released from the fixing.

Figure 6A:
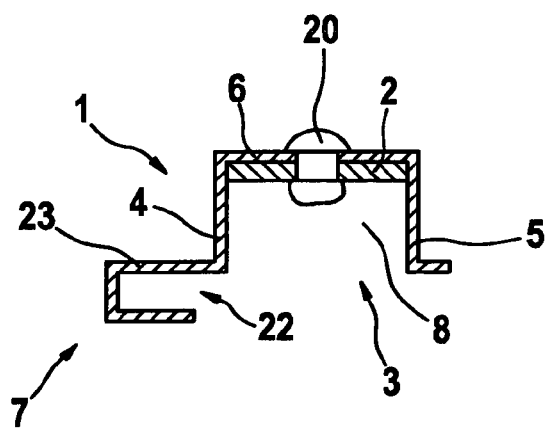
FIGS. 6a and 6b show, schematically, a fixing part provided with a through bore and with a hose clamp fastened to the fixing part by a plastic rivet.
Figure 6B:
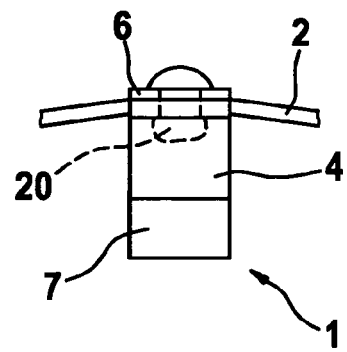

Another embodiment for the releasable fixing is shown in FIGS. 6a and 6b. FIGS. 6a and 6b show, schematically, a fixing part 1 provided with a through bore and with a hose clamp 2 which is fastened to the fixing part 1 by a plastic rivet 20. FIG. 6a shows a side view and FIG. 6b shows a plan view looking toward the end face (not shown here) of the hose end.

With regard to the general configuration of the fixing part 1, reference is made to the description for FIGS. 1a and 1b for the purpose of avoiding repetition, with identical reference numbers referring to identical components.

According to the invention, both the web 6 of the U-shaped element and the annular segment of the hose clamp 2 have a through bore and are connected to each other by means of a plastic rivet 20 in such a manner that the plastic rivet 20 is pulled out of the through bore of the hose clamp 2 during tightening of the hose clamp 2, with the hose clamp 2 being released.

Figure 7A:
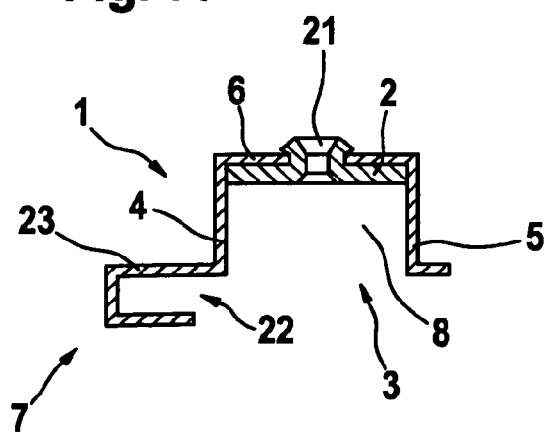
FIGS. 7a and 7b show, schematically, a fixing part provided with a through bore and with a hose clamp fastened by a protuberance.
Figure 7B:
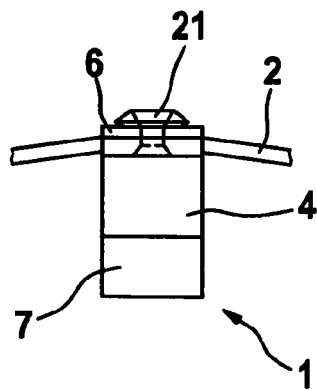

Another embodiment for the releasable fixing is shown in FIGS. 7a and 7b which show, schematically, a fixing part 1 provided with a through bore and with a hose clamp 2 fastened by a protuberance 21. FIG. 7a is a side view and FIG. 7b shows a view looking in the direction of the end face (not shown here) of the hose end.

With regard to the general configuration of the fixing part 1, reference is made to the description for FIGS. 1a to 1c for the purpose of avoiding repetition, with identical reference numbers referring to identical components.

According to the invention, the web 6 of the U-shaped element has a through bore, but the annular segment of the hose clamp 2 has a protuberance 21. The protuberance 21 is guided through the bore and is bent outwards to releasably fix the hose clamp 2 to the U-shaped element. When the hose clamp 2 is tightened, the protuberance 21 deforms and is pulled out of the through bore because of the deformation, with the hose clamp 2 being released from the fixing part 1.

Figure 8:
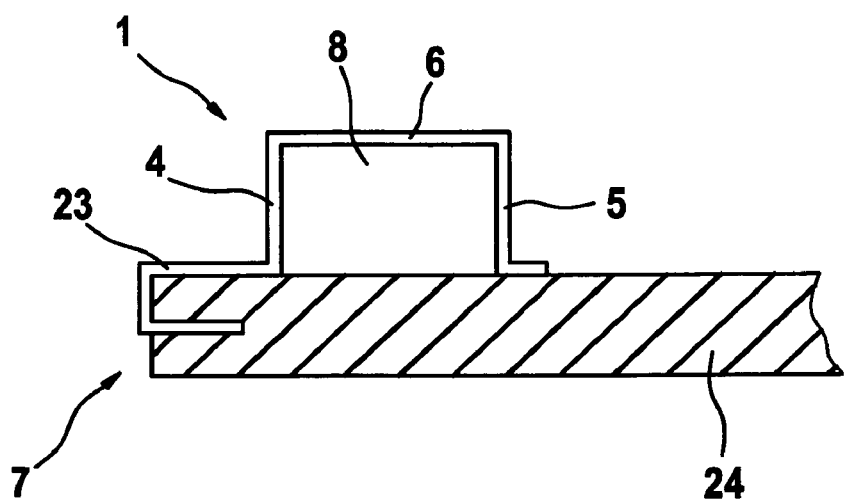
FIG. 8 shows, schematically, in side view, a fixing part with a connecting piece which is pushed into the hose end illustrated in longitudinal section.

FIG. 8 shows, schematically, in side view, a fixing part 1 according to the invention with a connecting element 7 which is pushed into a hose end 24 (shown in longitudinal section). In this case, the U-leg of the connecting element 7, which U-leg is not connected to the U-leg 4 of the U-shaped element, is located in the end-side hose wall.

With regard to the general configuration of the fixing part 1, reference is made to the description for FIGS. 1a to 1c for the purpose of avoiding repetition, with identical reference numbers referring to identical components.

Figure 9:
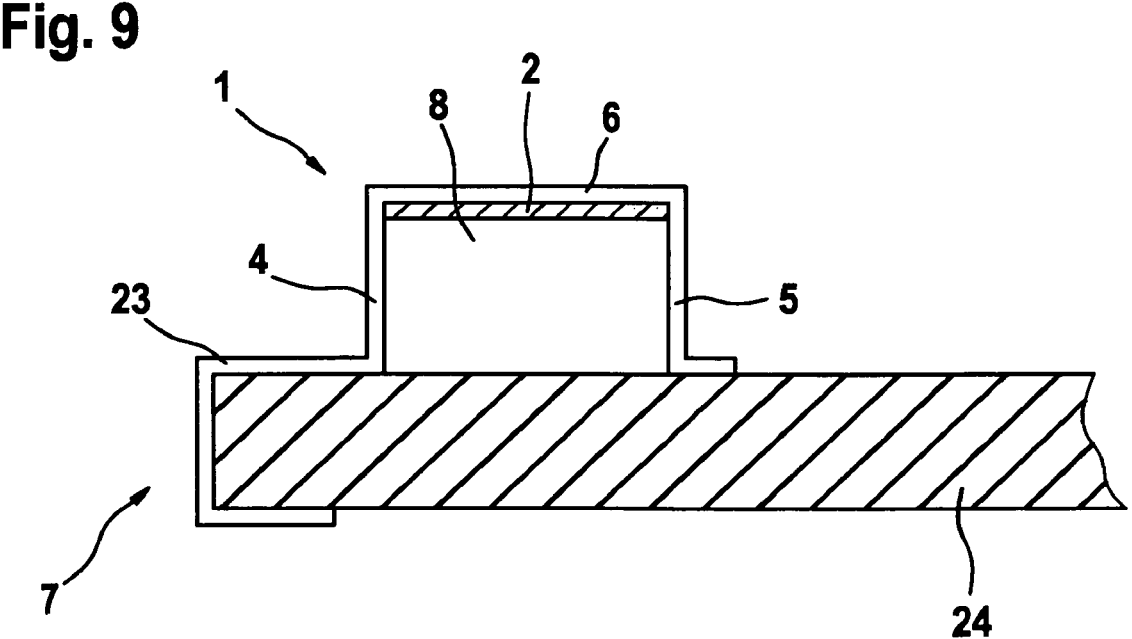
FIG. 9 shows, schematically, in side view, a fixing part with a connecting piece which is pressed onto the hose end illustrated in longitudinal section.

FIG. 9 shows, schematically, in side view, a fixing part 1 according to the invention with a connecting element 7 which is pressed onto the hose end 24 (shown in longitudinal section). In this embodiment, the end face of the hose wall is located between the U-legs of the connecting element 7.

With regard to the general configuration of the fixing part 1, reference is made to the description for FIGS. 1a and 1b for the purpose of avoiding repetition, with identical reference numbers referring to identical components.

An annular segment (shown in cross section) of the hose clamp 2 is arranged in the intermediate space 8 of the U-shaped element of the fixing part 1. In contrast to the releasable attachments shown in the embodiments of FIGS. 1a to 7b, the annular segment is only placed loosely in the intermediate space 8 of the U-shaped element and at a distance from the hose surface. The hose clamp 2 is fixed on the hose end 24 against axial displacement.

After the hose clamp 2 is tightened, the fixing part 1 also remains here without function on the hose end 24.

Figure 10:
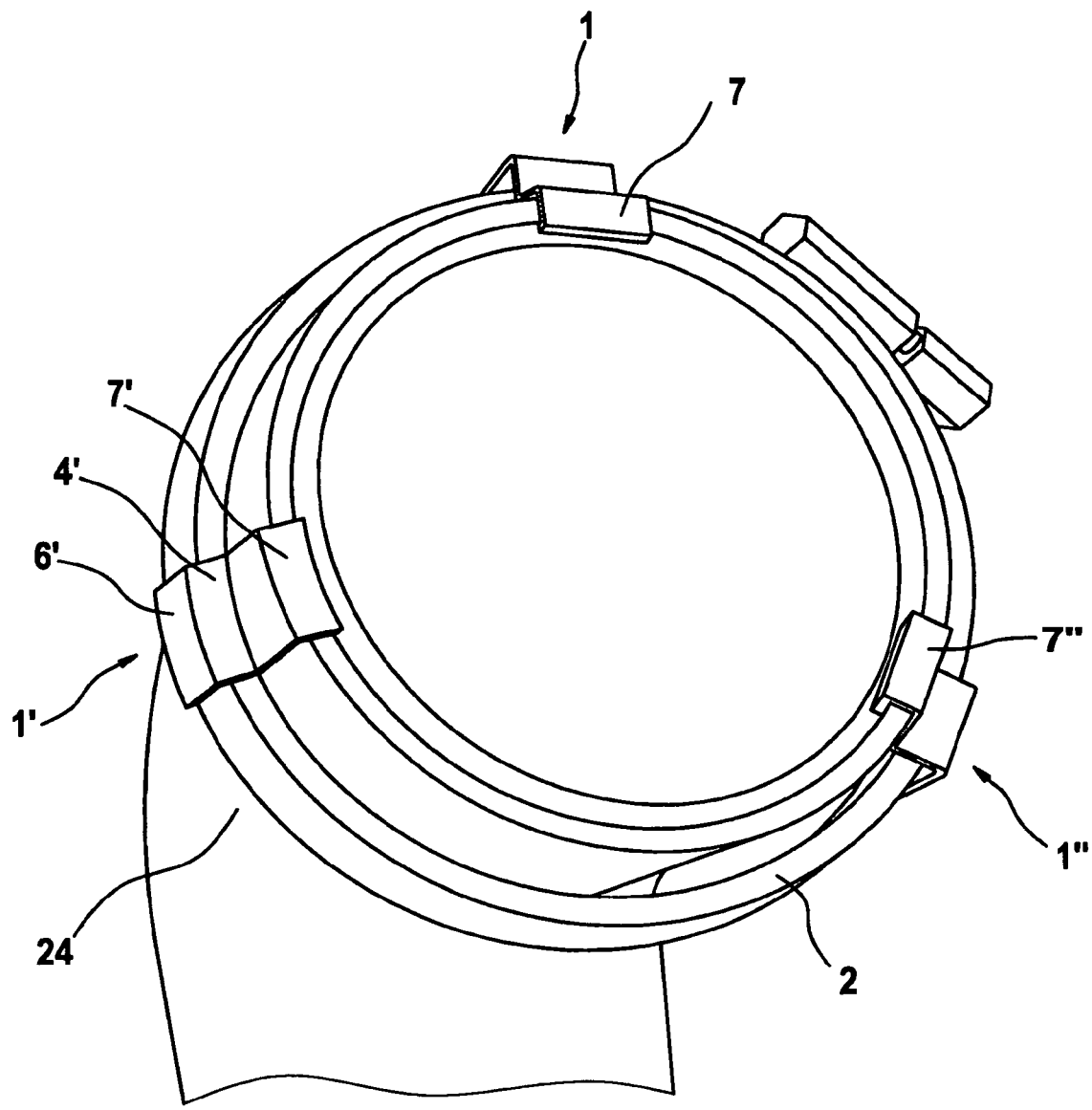
FIG. 10 shows, in a perspective view, a system which is fastened to a hose end and is for pre-positioning a hose clamp on the hose end.

FIG. 10 is a perspective view showing a system according to the invention which is fastened to a hose end 24 and pre-positions a hose clamp 2 on the hose end 24.

The system here comprises three fixing parts 1, 1' and 1" having respective U-shaped connecting elements (7, 7', 7") inserted into the hose end 24. In this embodiment, the U-leg of the connecting element (7, 7', 7") is disposed in the end face of the hose wall. This U-leg of the connecting element (7, 7', 7") is not connected to the U-leg (4, 4') of the U-shaped element.

The fixing part 1' of the system is connected unreleasably to an annular segment of the hose clamp 2 by spot welding. In this region, the hose clamp 2 rests on the hose surface. With this fixing part 1', the hose clamp 2 can be pre-positioned so as not to rotate on the hose end 24 and can be finally installed later.

In the other two fixing parts 1 and 1", the hose clamp 2 is fixed releasably, preferably latched-in or clipped-in with an annular segment and at a relatively large radial distance from the hose surface. By means of these fixing parts 1 and 1", the hose clamp 2 can be pre-positioned on the hose end 24 in particular against axial displacement.

With the system, the hose clamp 2 is secured axially and radially against displacement and therefore has good assembly characteristics.

After the hose end 24 is pushed onto a pipe stub (not shown here), the hose clamp 2 can be securely tightened and consequently finally installed with the hose clamp being released from the fixing parts 1 and 1" and pressing the hose end 24 securely onto the pipe stub. The fixing parts land 1 and 1" remain without function on the hose end 24.

It is understood that the foregoing description is that of the preferred embodiments of the invention and that various changes and modifications may be made thereto without departing from the spirit and scope of the invention as defined in the appended claims.

LIST OF REFERENCE NUMBERS (is Part of the Description)
1 Fixing part
2 Hose clamp
3 open side
4 U-leg
5 U-leg
6 Web
7 Connecting element 8 Intermediate space
9 Crease
10 Projection
11 Punch indent
12 Projection
13 Notch
14 open side
15 Web
16 U-leg
17 U-leg
18 Projection
19 Tab
20 Plastic rivet
21 Protuberance
22 Open end
23 U-leg
24 Hose end

What is claimed is:

1. A system for pre-positioning a hose clamp pulled onto a hose end preparatory to clamping said hose clamp, the hose end having a hose surface, the system comprising:
a first fixing part attached to said hose end and undetachably connected to a first annular segment of said hose clamp;
a second fixing part separate from and not fixedly connected to said first fixing part thereby permitting said hose end to expand when pushed onto a pipe stub;
said second fixing part being attached to said hose end and including a U-shaped element defining an opening facing toward said hose surface of said hose end;
said U-shaped element having first and second U-legs and a web connecting said U-legs to each other;
said web running axially and parallelly to said hose surface;
said first U-leg lying closer to said hose end than said second U-leg and said first U-leg having a connecting element for attaching said U-shaped element to the end face of said hose end;
said U-shaped element and said hose surface conjointly defining an intermediate space; and,
said U-shaped element being configured so as to releasably hold said hose clamp at a second annular segment thereof in said intermediate space so as to cause said second annular segment to be in spaced relationship to said hose surface and to separate from said U-shaped element when said hose clamp is tightened to clamp said hose end and said second fixing part remains on said hose end without a function after said hose clamp is tightened.

2. The system of claim 1, wherein said U-shaped element includes means for fixing said second annular segment in said intermediate space in such a manner that said hose clamp separates from said U-shaped element when said hose clamp is tightened.

3. The system of claim 2, wherein said fixing means comprises a releasable snap or latch connection disposed between said second annular segment and said web.

4. The system of claim 1, wherein said U-shaped element is so configured that said hose clamp is loosely held at said second annular segment by said first and second U-legs in said intermediate space against an axial displacement with said hold being broken when said hose clamp is tightened.

5. The system of claim 4, wherein said hold between said U-shaped element and said second annular segment is provided by a releasable snap or latch connection between said second annular segment and said U-shaped element.

6. The system of claim 4, wherein said U-legs have inner sides whereon respective hooks, nubs, beads or other projections are disposed defining respective undercuts directed to said web wherein the edges of said second annular segment can be latched.

7. The system of claim 4, wherein said U-legs have respective outer sides and respective creases formed therein to provide corresponding projections defining respective undercuts on the inner side of said U-legs respectively into which the side edges of said second annular segment can be releasably snapped.

8. The system of claim 4, wherein said U-legs have respective outer sides and respective punch indents formed therein to provide corresponding projections defining respective undercuts on inner sides of said U-legs whereinto side edges of said second annular segment can be releasably latched.

9. The system of claim 4, wherein said U-legs have respective inside surfaces and respective undercuts formed therein wherein side edges of said second annular segment can be releasably latched.

10. The system of claim 9, wherein said undercuts are defined by recesses, notches or other depressions.

11. The system of claim 4, wherein said second annular segment is disposed force tight or wedged between said first and second U-legs; and, said first and second U-legs run wedge-shaped on their respective inner sides toward said web.

12. The system of claim 1, wherein said first fixing part is attached to said first annular segment in such a manner that said hose clamp lies in contact engagement with said hose surface in the region of said first annular segment after said first fixing part is mounted on said hose end.

13. The system of claim 1, wherein said first and second fixing parts and said hose clamp are connectable to form a unit in advance of mounting on said hose end.

14. The system of claim 1, wherein parts of said U-shaped element or said second annular segment are plastically deformable for releasably fixing said hose clamp.

15. The system of claim 1, wherein said connecting element is pressed with said hose end.

16. The system of claim 1, wherein said connecting element is pushed into said hose end.

17. The system of claim 1, wherein said connecting element is a U-shaped part having an open end facing toward the end face of said hose end; and, said U-shaped part and said U-shaped element are an integral single body.

18. The system of claim 1, wherein said first and second fixing parts are made of metal and/or plastic.

19. The system of claim 1, wherein said first fixing part is attached to said first annular segment by a spot weld so that said hose clamp lies in contact engagement with said hose surface in the region of said first annular segment after said first fixing part is mounted on said hose end.

20. The system of claim 1, wherein said first annular segment has a first surface facing toward said hose surface and a second surface facing away from said hose surface; and, said first fixing part is connected to said hose clamp at said second surface thereof thereby leaving said first surface smooth.

21. A system for pre-positioning a hose clamp pulled onto a hose end preparatory to clamping said hose clamp, the hose end having a hose surface, the system comprising:
a first fixing part attached to said hose end and undetachably connected to a first annular segment of said hose clamp;
a second fixing part attached to said hose end and including a U-shaped element defining an opening facing toward said hose surface of said hose end;

said U-shaped element having first and second U-legs and a web connecting said U-legs to each other;
said web running axially and parallelly to said hose surface;
said first U-leg lying closer to said hose end than said second U-leg and said first U-leg having a connecting element for attaching said U-shaped element to the end face of said hose end;
said U-shaped element and said hose surface conjointly defining an intermediate space;
said U-shaped element being configured so as to releasably hold said hose clamp at a second annular segment thereof in said intermediate space so as to cause said second annular segment to separate from said U-shaped element when said hose clamp is tightened to clamp said hose end and said second fixing part remains on said hose end without a function after said hose clamp is tightened;
said first fixing part being attached to said first annular segment in such a manner that said hose clamp lies in contact engagement with said hose surface in the region of said first annular segment after said first fixing part is mounted on said hose end;
said first fixing part including a U-shaped element defining an opening facing toward said hose surface;
said U-shaped element of said first fixing part having first and second U-legs and a web connecting said U-legs to each other;
said web of said U-shaped element of said first fixing part running axially and parallelly to said hose surface; and,
said first U-leg of said U-shaped element of said first fixing part lying closer to said hose end than said second U-leg thereof and said first U-leg of said U-shaped element of said first fixing part having a connecting element for attaching said U-shaped element of said first fixing part to said end face of said hose end.

22. A system for pre-positioning a hose clamp pulled onto a hose end preparatory to clamping said hose clamp, the hose end having a hose surface, the system comprising:
a first fixing part attached to said hose end and undetachably connected to a first annular segment of said hose clamp;
a second fixing part attached to said hose end and including a U-shaped element defining an opening facing toward said hose surface of said hose end;
said U-shaped element having first and second U-legs and a web connecting said U-legs to each other;
said web running axially and parallelly to said hose surface;
said first U-leg lying closer to said hose end than said second U-leg and said first U-leg having a connecting element for attaching said U-shaped element to the end face of said hose end;
said U-shaped element and said hose surface conjointly defining an intermediate space;
said U-shaped element being configured so as to releasably hold said hose clamp at a second annular segment thereof in said intermediate space so as to cause said second annular segment to separate from said U-shaped element when said hose clamp is tightened to clamp said hose end and said second fixing part remains on said hose end without a function after said hose clamp is tightened;
said U-shaped element including means for fixing said second annular segment in said intermediate space in such a manner that said hose clamp separates from said U-shaped element when said hose clamp is tightened;
said fixing means comprising a releasable snap or latch connection disposed between said second annular segment and said web;
said web being a U-shaped plastic part having an open side facing toward said hose surface and connecting said first and second U-legs; and,
said U-shaped plastic part further having U-legs having respective ends defining corresponding projections forming respective undercuts whereinto the side edges of said second annular segment can be releasably latched.

23. A system for pre-positioning a hose clamp pulled onto a hose end preparatory to clamping said hose clamp, the hose end having a hose surface, the system comprising:
a first fixing part attached to said hose end and undetachably connected to a first annular segment of said hose clamp;
a second fixing part attached to said hose end and including a U-shaped element defining an opening facing toward said hose surface of said hose end;
said U-shaped element having first and second U-legs and a web connecting said U-legs to each other;
said web running axially and parallelly to said hose surface;
said first U-leg lying closer to said hose end than said second U-leg and said first U-leg having a connecting element for attaching said U-shaped element to the end face of said hose end;
said U-shaped element and said hose surface conjointly defining an intermediate space;
said U-shaped element being configured so as to releasable hold said hose clamp at a second annular segment thereof in said intermediate space so as to cause said second annular segment to separate from said U-shaped element when said hose clamp is tightened to clamp said hose end and said second fixing part remains on said hose end without a function after said hose clamp is tightened;
said U-shaped element being so configured that said hose clamp is loosely held at said second annular segment by said first and second U-legs in said intermediate space against an axial displacement with said hold being broken when said hose clamp is tightened;
said U-legs having respective inside surfaces and respective undercuts formed therein wherein side edges of said second annular segment can be releasably latched;
said undercuts being defined by recesses, notches or other depressions;
said U-legs having respective tabs formed thereon which lie opposite each other and project out from corresponding ones of said U-legs with their free ends extending into said intermediate space;
said tabs being disposed with respect to said hose surface so as to permit said second annular segment to be arranged between said web and said tabs; and,
said tabs being configured so as to be pressed back against leg walls when said hose clamp is tightened.

24. A system for pre-positioning a hose clamp pulled onto a hose end preparatory to clamping said hose clamp, the hose end having a hose surface, the system comprising:
a first fixing part attached to said hose end and undetachably connected to a first annular segment of said hose clamp;
a second fixing part attached to said hose end and including a U-shaped element defining an opening facing toward said hose surface of said hose end;

said U-shaped element having first and second U-legs and a web connecting said U-legs to each other;

said web running axially and parallelly to said hose surface;

said first U-leg lying closer to said hose end than said second U-leg and said first U-leg having a connecting element for attaching said U-shaped element to the end face of said hose end;

said U-shaped element and said hose surface conjointly defining an intermediate space;

said U-shaped element being configured so as to releasably hold said hose clamp at a second annular segment thereof in said intermediate space so as to cause said second annular segment to separate from said U-shaped element when said hose clamp is tightened to clamp said hose end and said second fixing part remains on said hose end without a function after said hose clamp is tightened;

said U-shaped element including means for fixing said second annular segment in said intermediate space in such a manner that said hose clamp separates from said U-shaped element when said hose clamp is tightened;

said fixing means comprising a through bore formed in said web and in said second annular segment of said hose clamp;

a plastic rivet connecting said web and said second annular segment; and, said plastic rivet being configured so as to be pulled out from said through bore when said hose clamp is tightened thereby separating said hose clamp from said U-shaped element.

25. A system for pre-positioning a hose clamp pulled onto a hose end preparatory to clamping said hose clamp, the hose end having a hose surface, the system comprising:

a first fixing part attached to said hose end and undetachably connected to a first annular segment of said hose clamp;

a second fixing part attached to said hose end and including a U-shaped element defining an opening facing toward said hose surface of said hose end;

said U-shaped element having first and second U-legs and a web connecting said U-legs to each other;

said web running axially and parallelly to said hose surface;

said first U-leg lying closer to said hose end than said second U-leg and said first U-leg having a connecting element for attaching said U-shaped element to the end face of said hose end;

said U-shaped element and said hose surface conjointly defining an intermediate space;

said U-shaped element being configured so as to releasably hold said hose clamp at a second annular segment thereof in said intermediate space so as to cause said second annular segment to separate from said U-shaped element when said hose clamp is tightened to clamp said hose end and said second fixing part remains on said hose end without a function after said hose clamp is tightened;

said U-shaped element including means for fixing said second annular segment in said intermediate space in such a manner that said hose clamp separates from said U-shaped element when said hose clamp is tightened;

said fixing means comprising a through bore formed in said web;

a protuberance on said second annular segment being guided through said through bore; and, said protuberance being bent over outwardly on said U-shaped element for releasably fixing said hose clamp thereon.

26. A system for pre-positioning a hose clamp pulled onto a hose end preparatory to clamping said hose clamp, the hose end having a hose surface, the system comprising:

a first fixing part attached to said hose end and undetachably connected to a first annular segment of said hose clamp;

second and third fixing parts separate from and not fixedly connected to said first fixing part thereby permitting said hose end to expand when pushed onto a pipe stub;

said first and second fixing parts being attached to said hose end and each of said second and third fixing parts including a U-shaped element defining an opening facing toward said hose surface of said hose end;

said U-shaped element having first and second U-legs and a web connecting said U-legs to each other;

said web running axially and parallelly to said hose surface;

said first U-leg lying closer to said hose end than said second U-leg and said first U-leg having a connecting element for attaching said U-shaped element to the end face of said hose end;

said U-shaped element and said hose surface conjointly defining an intermediate space;

the U-shaped element of said second fixing part being configured so as to releasably hold said hose clamp at a second annular segment thereof in said intermediate space so as to cause said second annular segment to be in spaced relationship to said hose surface and to separate from said U-shaped element when said hose clamp is tightened to clamp said hose end and said second fixing part remains on said hose end without a function after said hose clamp is tightened; and, the U-shaped element of said third fixing part being configured so as to releasably hold said hose clamp at a third annular segment thereof in said intermediate space so as to cause said third annular segment to be in spaced relationship to said hose surface and to separate from said U-shaped element when said hose clamp is tightened to clamp said hose end and said third fixing part remains on said hose end without a function after said hose clamp is tightened.

27. The system of claim 26, wherein said first, second and third fixing parts are spaced one from the other at equal angular distances about the periphery of said hose end.

* * * * *